United States Patent
Ryf

(10) Patent No.: US 8,235,436 B2
(45) Date of Patent: Aug. 7, 2012

(54) BUNDLE GRIPPER FOR A PALLETIZING MACHINE AND METHOD FOR THE PALLETIZING OF BUNDLES

(75) Inventor: Marc Ryf, Aarau (CH)

(73) Assignee: Mueller Martini Holding AG, Hergiswil (CH)

( * ) Notice: Subject to any disclaimer, the term of this patent is extended or adjusted under 35 U.S.C. 154(b) by 664 days.

(21) Appl. No.: 12/340,183

(22) Filed: Dec. 19, 2008

(65) Prior Publication Data
US 2009/0162181 A1     Jun. 25, 2009

(30) Foreign Application Priority Data
Dec. 20, 2007 (EP) .................................. 07405365

(51) Int. Cl.
*B25J 15/08* (2006.01)
(52) U.S. Cl. ...... 294/67.22; 294/2; 294/103.1; 294/197; 414/622; 414/671
(58) Field of Classification Search ........... 294/2, 103.1, 294/67.22, 67.31, 67.33, 197; 414/789.9, 414/790.2, 622, 667, 671
See application file for complete search history.

(56) References Cited

U.S. PATENT DOCUMENTS

| | | | | |
|---|---|---|---|---|
| 2,973,876 A | * | 3/1961 | Voss | 414/622 |
| 4,266,819 A | * | 5/1981 | Pemberton | 294/197 |
| 4,383,788 A | * | 5/1983 | Sylvander | 414/792.9 |
| 4,746,255 A | * | 5/1988 | Roccabianca et al. | 414/793.8 |
| 4,787,810 A | | 11/1988 | Cawley et al. | |
| 5,042,862 A | * | 8/1991 | Tubke | 294/86.4 |
| 5,628,539 A | * | 5/1997 | Muchalov et al. | 294/86.4 |
| 6,082,797 A | * | 7/2000 | Antonette | 294/103.1 |
| 6,089,633 A | * | 7/2000 | Jacob | 294/67.22 |

FOREIGN PATENT DOCUMENTS

| | | |
|---|---|---|
| EP | 0 816 272 A1 | 1/1998 |
| EP | 1 155 984 A1 | 11/2001 |
| EP | 1 801 047 A2 | 6/2007 |
| WO | WO 86/07579 | 12/1986 |

OTHER PUBLICATIONS

European Search Report, Application EP 07 40 5365, Dated May 13, 2008.

* cited by examiner

*Primary Examiner* — Dean Kramer
(74) *Attorney, Agent, or Firm* — Venable LLP; Robert Kinberg; Leigh D. Thelen

(57) ABSTRACT

A bundle gripper for a palletizing machine for picking up respectively at least one bundle and depositing the bundle on a pallet. The bundle gripper including a frame, an adjustable end stop, and at least one gripper finger such that the gripper finger has a front end and is adjustable on the frame. The gripper finger being movable between a first position and a second position. The bundle gripper also including a hold-down clamp coupled to the frame and positioned against the end stop for clamping the bundle against the gripper finger such that a distance between the end stop and the front end of the gripper finger in the second position is changeable to adapt to different lengths of the bundles. The end stop and the gripper finger are each movable to change the distance and the hold-down clamp is correspondingly adjustable to accommodate different lengths of the bundles.

21 Claims, 9 Drawing Sheets

BUNDLE GRIPPER FOR A PALLETIZING MACHINE AND METHOD FOR THE PALLETIZING OF BUNDLES

CROSS-REFERENCE TO RELATED APPLICATION

This application claims the priority of the European patent Application 07405365.3, filed on Dec. 20, 2007, the subject matter of which is incorporated herein by reference.

BACKGROUND OF THE INVENTION

The present invention relates to a bundle gripper for a palletizer or palletizing machine. The bundle gripper may pick up respectively at least one bundle of printed or non-printed products from a feeding device and deposit the bundle on a pallet. The bundle gripper includes at least one gripper finger positioned on a frame, which can be moved between a first and a second position. The gripper finger is located at least partially behind an end stop in the first position. In the second position, the gripper finger is located in front of the end stop in a horizontal operating state so that the at least one bundle rests on the gripper finger. The bundle gripper is in a retracted position in the first position, whereas the bundle gripper is in an operating state in the second position. The bundle gripper further includes a hold-down clamp for clamping the bundle positioned on the gripper finger. The hold-down clamp rests against the end stop. The distance between the end stop and a front end of the gripper finger in the second position can be changed for adapting the gripper finger to different bundle lengths. The invention also relates to a method for palletizing bundles of printed or non-printed products with the aid of a palletizing machine.

European patent document EP-A-1 801 047 discloses a bundle gripper, which is used to pick up respectively two side-by-side arranged stacks from a feeding device and deposit these stacks on a pallet. Each stack is gripped with two side-by-side arranged gripper fingers or support elements and an above-arranged hold-down clamp. In addition, the gripper fingers can be adjusted by releasing a lever, so that the distance between the end stop and the front end of the gripper fingers in a working position can be changed. For adapting the bundle gripper to different formats, the two gripper fingers upon which the bundles can be placed can be adjusted relative to each other, thereby permitting an adaptation to different stack widths. To deposit the stack on a pallet, the two gripper fingers are pulled back behind an end stop which exposes the stack bottom and causes the stack to drop onto the pallet. Two pairs of gripper fingers are furthermore provided to allow the simultaneous palletizing of two stacks, wherein the spacing between the two stacks can be adjusted.

A different stack gripper is known from European patent document EP-A-0 816 272. This document discloses a stack space open toward the bottom and includes a separate guide for each of the four sides of the bundle stack. Two telescopically extendable belts are located in the lower region of the stack space. The product stacks are moved into the stack space while positioned transverse on the extendable belts. Following the insertion of the bundle stack, the guides are adjusted to simultaneously surround and touch the bundle stack. The bundle stack is then deposited on a pallet by shortening the belts with the aid of a lifting movement.

SUMMARY

It is an object of the present invention to create a bundle gripper of the aforementioned type, which can be adapted without manual intervention to different bundle formats, especially bundle lengths.

The above and other objects are accomplished according to one aspect of the invention wherein there is provided a bundle gripper for a palletizing machine for picking up respectively at least one bundle and depositing the bundle on a pallet, the bundle gripper comprising: a frame; an adjustable end stop coupled to the frame; at least one gripper finger coupled to the frame, wherein the gripper finger has a front end and is adjustable on the frame, the gripper finger being movable between a first position and a second position, wherein the gripper finger in the first position is located at least partially behind the end stop away from receipt of the bundle and in the second position is located in front of the end stop in a horizontal operating state to receive the at least one bundle, with the bundle fitting against the end stop; and a hold-down clamp coupled to the frame and positioned against the end stop for clamping the bundle against the gripper finger, and wherein a distance between the end stop and the front end of the gripper finger in the second position is changeable to adapt to different lengths of the bundles, the end stop and the gripper finger are each movable to change the distance, and the hold-down clamp is correspondingly adjustable to accommodate different lengths of the bundles.

The bundle gripper according to an embodiment of the invention includes an end stop that may be moved and/or the length of the gripper finger and/or the hold-down clamp can may be adjusted in order to change the spacing.

The bundle gripper according to an embodiment of the invention is suitable for picking up printed or non-printed products that may be bound or non-bound. For example, the products may be held together to form a bundle with the aid of a film or with straps. With non-bound stacks, the products may be held together with the aid of an electrostatic charge. For the purpose of this application, a bundle is therefore understood to also include a stack of loose products. The products may be non-printed paper sheets or printed products such as printed signatures, individual sheets, newspapers, magazines, catalogs, books or the like.

According to one embodiment of the invention, the end stop may essentially be displaced in a longitudinal direction of the gripper finger in order to adapt to different bundle formats. An end stop of this type may be adjusted relatively quickly and over a comparatively large range size. According to another embodiment of the invention, a stop element includes the end stop and a recess, wherein the gripper finger is arranged within the recess. The recess is open in the front, so that the gripper finger may be moved in and out through the recess. The stop element may form two stop edges, arranged at a distance to each other, between which the gripper finger and the hold-down clamp may be moved. As a result, relatively wide bundles may therefore be gripped with only one gripper finger and a hold-down clamp and the bundles may be stripped off along the end stop for the palletizing.

According to one embodiment of the invention, the total length of the gripper fingers and/or the hold-down clamp may be adjusted for adapting to different bundle lengths. The gripper finger and/or the hold-down clamp may advantageously be adjusted in a telescoping manner in a lengthwise direction.

According to another embodiment of the invention, a motor may be used to change the distance between the front end of the gripper finger and the end stop or to adjust the length of the hold-down clamp, which permits a particularly fast adjustment to the different bundle formats. An extremely precise adjustment may be achieved, for example, by using a spindle.

According to yet another embodiment of the invention, the gripper finger is mounted on an arm at a joint, which allows the gripper finger to be moved between the first position and the second position. By using an arm of this type, the gripper finger may be arranged at an angle in the first position, thus permitting an especially space-saving and/or compact embodiment of the bundle gripper. From the first position, the gripper finger may be pushed in the manner of a shovel underneath a bundle to be palletized. As a result, the gripper finger only assumes a horizontal operating state when fully extended. Therefore, pressure is exerted on the bundle to be gripped only at the instant of contact, which prevents a displacement of the printed products. In order to strip off the bundle, the gripper finger is pulled back from underneath the bundle and is returned to the aforementioned slanted position. The gripper finger in that case may be comparatively long, so that it may be used to palletize bundles of very different lengths.

According to yet another embodiment of the invention, the bundle gripper includes two gripper units having respectively one gripper finger, one hold-down clamp, and one end stop. Bundles of different sizes may be palletized simultaneously. One bundle may be palletized with a respective gripper unit and one comparatively wide bundle may be palletized with a plurality of gripper units.

According to another embodiment of the invention, the two gripper units are positioned so as to be displaceable along the frame, thus making it possible to change the spacing between the two gripper units. If respectively two bundles are gripped, then the spacing between the two bundles may be changed for the palletizing, for example by placing the two bundles essentially next to each other. The position of the grippers may furthermore be adapted to special requirements for the printed products to be palletized, meaning the grippers do not have to be oriented symmetrical to the stack center. In particular, this may be required for inserting samples into the printed products, which may not be subjected to pressure.

The method according to the invention includes adjusting the spacing between the end stop and the front end of the gripper finger in the second position to adapt to a change of the bundle format. Such adjustment may be made by moving the end stop and/or by changing the length of the gripper finger and the hold-down clamp is correspondingly adjustable to accommodate different lengths of the bundles. The format change may also occur immediately after the palletizing of a bundle. Accordingly, during the period when the bundle gripper moves to the position in which at least one other bundle is picked up, the format change may occur so as to make it possible to process all different types of bundles without interrupting the production. Relatively wide bundles may be gripped with the aid of two gripper fingers and two hold-down clamps while comparatively narrow bundles may be gripped between one gripper finger and one hold-down clamp. Therefore, bundles having very different formats and especially having very different lengths may be palletized with this method. For example, bundles may be palletized with lengths (B) ranging approximately from 140-500 mm and bundles with widths (A) ranging approximately from 95-340 mm for the dual bundle productions. In addition, bundles with widths (A) ranging approximately from 340 to 520 mm may be palletized for the single bundle production.

BRIEF DESCRIPTION OF THE DRAWINGS

The present invention will be more readily understood from the following detailed description when read in conjunction with the accompanying drawings, in which.

DETAILED DESCRIPTION

Figure 8:
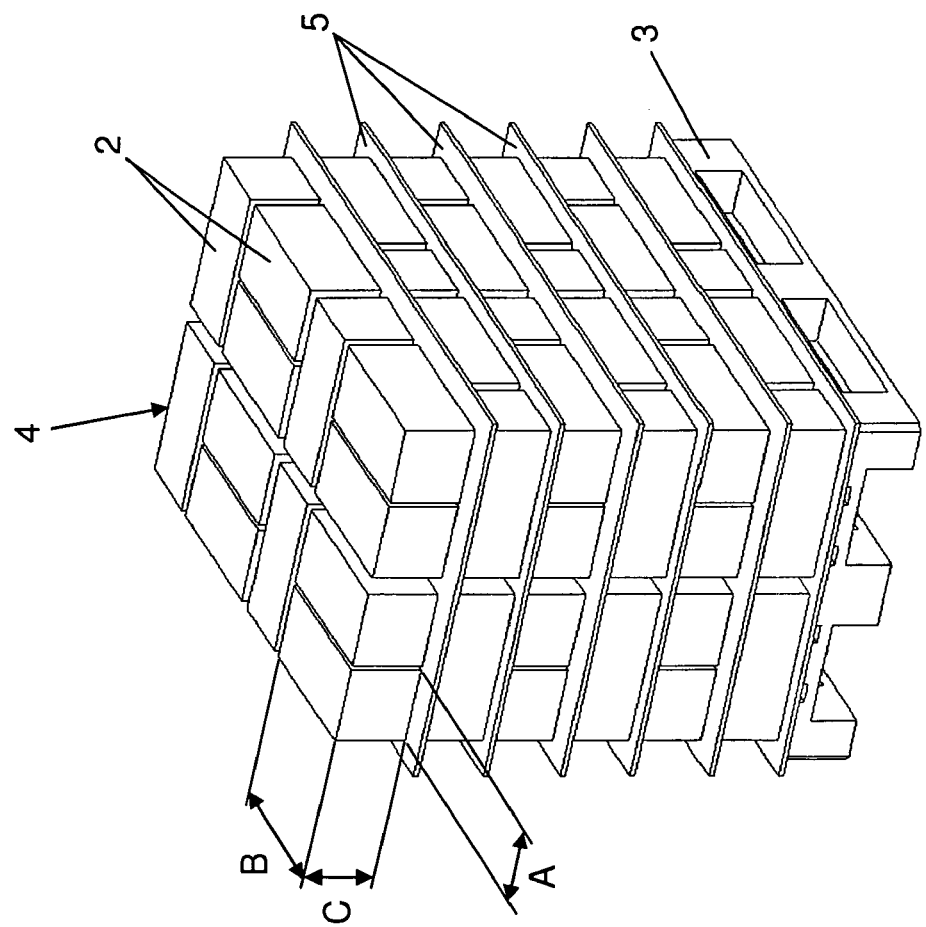
FIG. 8 is a three-dimensional view of a pallet with palletized bundle stack.

The bundle gripper 1 includes a frame 6 with a plate 10 for positioning the bundle gripper 1 inside a palletizing machine, not shown herein, such that the bundle gripper 1 may be moved in all spatial directions. The palletizing machine may include a bundle feeding device, for example, a simple belt conveyor. The palletizing machine further may include a loading position on the inside where a bundle layer 4, consisting of a plurality of bundles 2 and cardboard layers 5 in-between, may be formed on a pallet 3, as shown in FIG. 8. The palletizing machine, the feeding device, and the pallet 3 may be embodied in a manner known per se. The bundles 2 may be made available by the feeding device. The bundles 2 may then be gripped with the bundle gripper 1, transported to the pallet 3 by the bundle gripper 1, and deposited in a specific arrangement on the pallet 3. The bundles 2 may include printed products 9, for example printed sheets, newspapers, leaflets, catalogs, books and the like.

The bundles 2 may be non-bound or bound and respectively have a specific width A, a specific length B, and a specific height C. The bundles 2 may be square in shape. The aforementioned dimensions may vary greatly, wherein the bundle length B may range approximately from 140-500 mm, the bundle width A may range approximately from 95 to 340 mm and the bundle height may approximately reach up to 350 mm. Smaller or larger bundle formats may also be conceivable. The backs of the individual products in two successive bundles do not necessarily have to be aligned parallel. The bundle gripper 1 may be embodied such that the palletizing occurs automatically with the aid of a control unit 7 that is positioned on the frame 6. Cable conduits 16 are provided for the cables and lines necessary for the control and supply.

The bundle gripper 1 may include two units 8 for gripping and depositing the bundles 2. The units 8 are horizontally displaceable on a carrier 35 shown in FIG. 1 and on an additional carrier that is not shown herein. The carriers 35 are fixedly connected to the plate 10 with struts 38. The units 8 are respectively positioned on a positioning rail 13, extending transverse to the carrier 35. The positioning rail 13 is connected with guide elements 11 to the carrier 35 as well as to the additional carrier.

Figure 4:
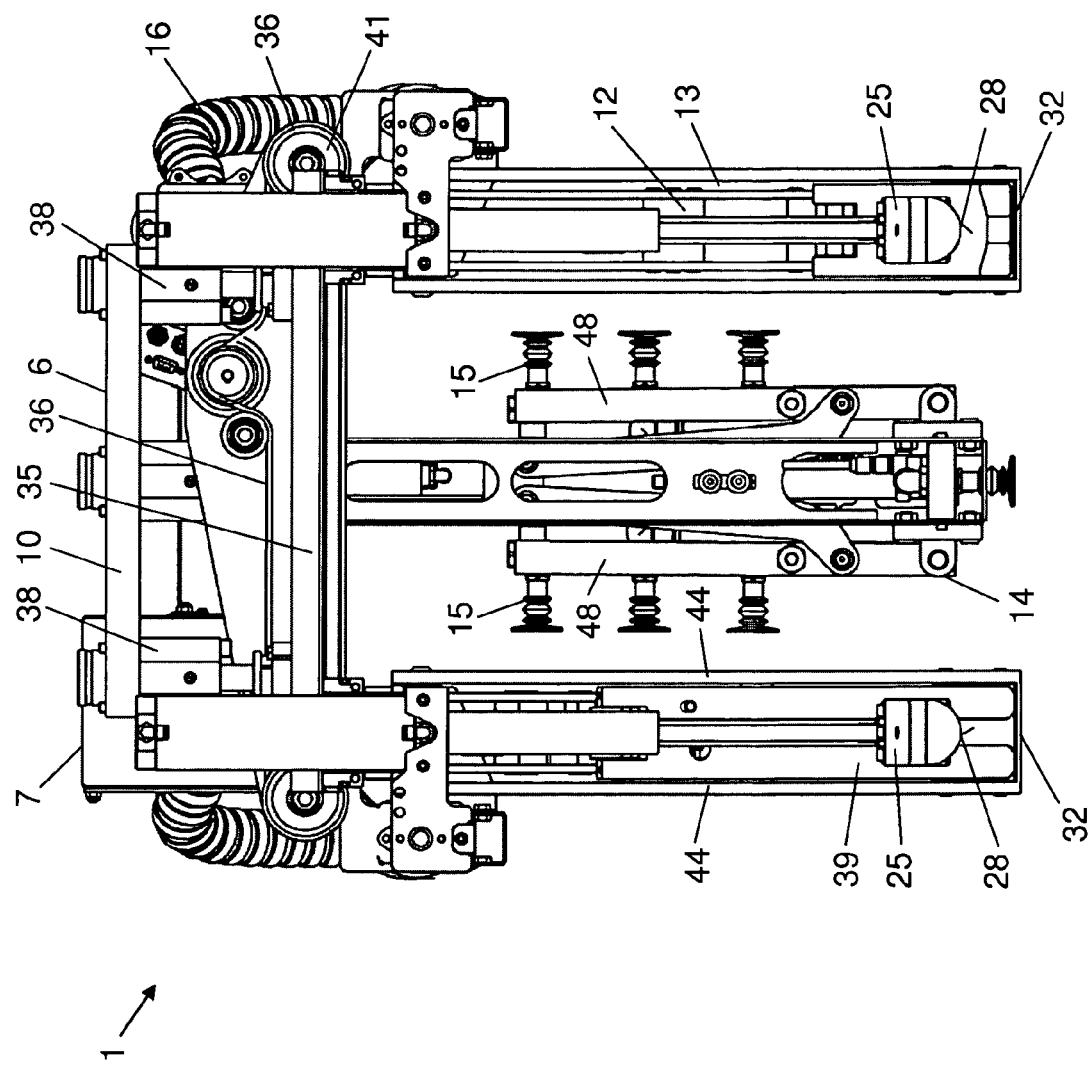
FIG. 4 is a view of the bundle gripper according to the invention as seen from the front.
Figure 5:
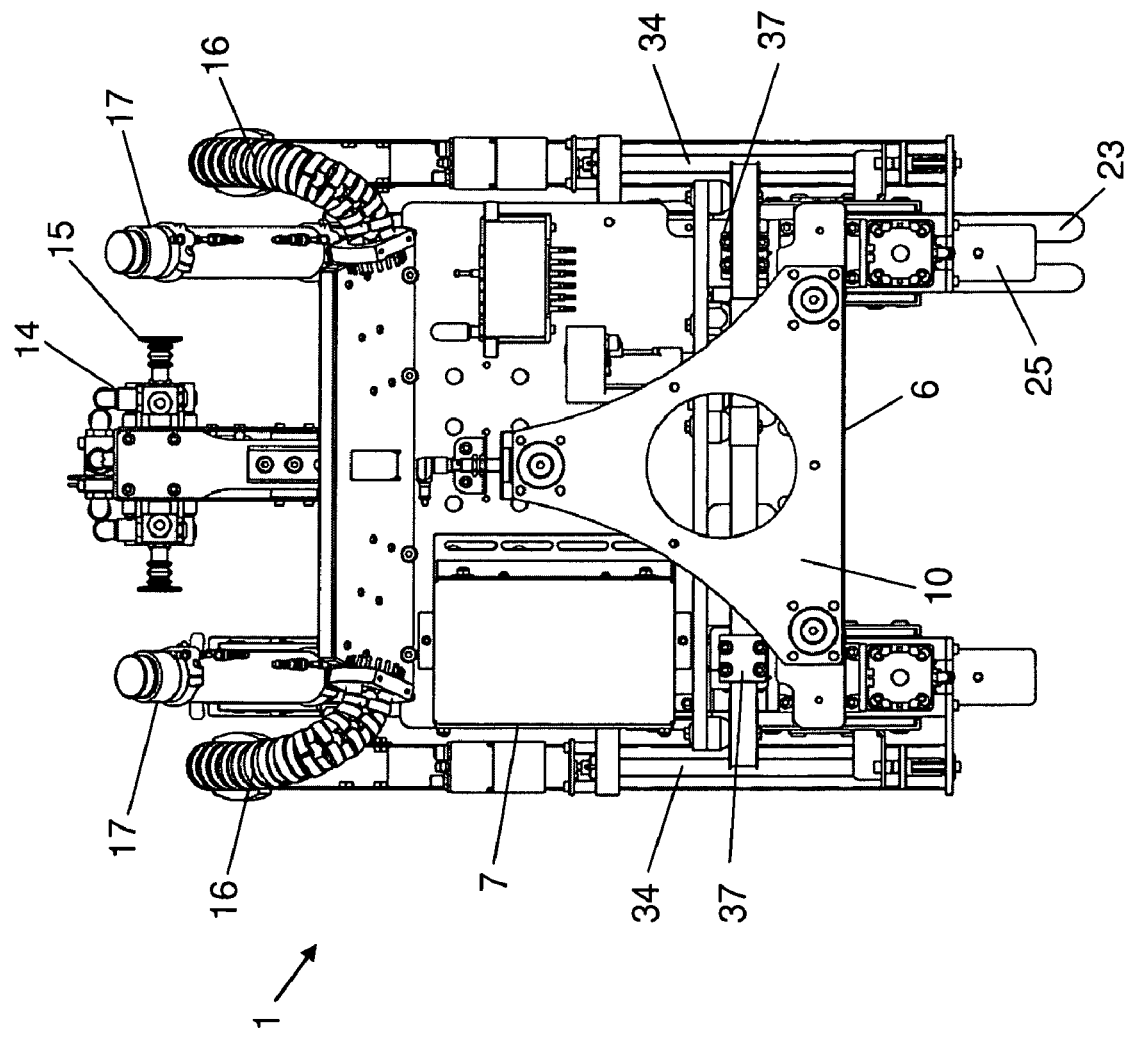
FIG. 5 is a view from above of the bundle gripper according to the invention.

Referring to FIG. 4, a drive belt 36 is provided according to FIG. 4 for moving the units 8 relative to each other. This drive belt is fitted around rollers 41 and is connected via an attachment 37, shown in FIGS. 1 and 4, to one of the units 8 and via another attachment that is not shown herein to the other unit 8. If a drive 51 is used to drive the drive belt 36, the two units 8 are moved either toward each other or away from each other, depending on the direction in which the drive belt 36 is driven. The movements of the units 8 are mirror-inverted as shown in FIG. 4. In place of the drive belt 36, a different suitable drive may also be provided for moving the two units 8. For example, a spindle drive or a drive with a cylinder could also be provided. If the two units 8 are provided with separate drives, the movements of the gripper units 8 may be independent, wherein the movement direction may be identical. The control unit 7 may also control the movements of the units 8.

The units 8 may include a separate stop element 30, positioned to be displaceable in horizontal direction along one of the positioning rails 13. The stop elements 30 are displaced with the aid of two drives 33, wherein each drive is connected via a spindle 34 to a stop element 30. These drives 33 are supported on the frame 6. The stop element 30 in the front is shown in different positions in FIGS. 2 and 3, wherein the spacing differs between a stop face 42, shown in FIGS. 2 and 3, and a front side 43 of the positioning rails 13. This distance is considerably longer in FIG. 2 than in FIG. 3. In these positions, as well as between these positions, the stop elements 30 may be positioned precisely by turning the spindle 34 and may be secured in place. The stop elements 30 for the two gripper units 8 may thus occupy different positions relative to each other.

Figure 1:
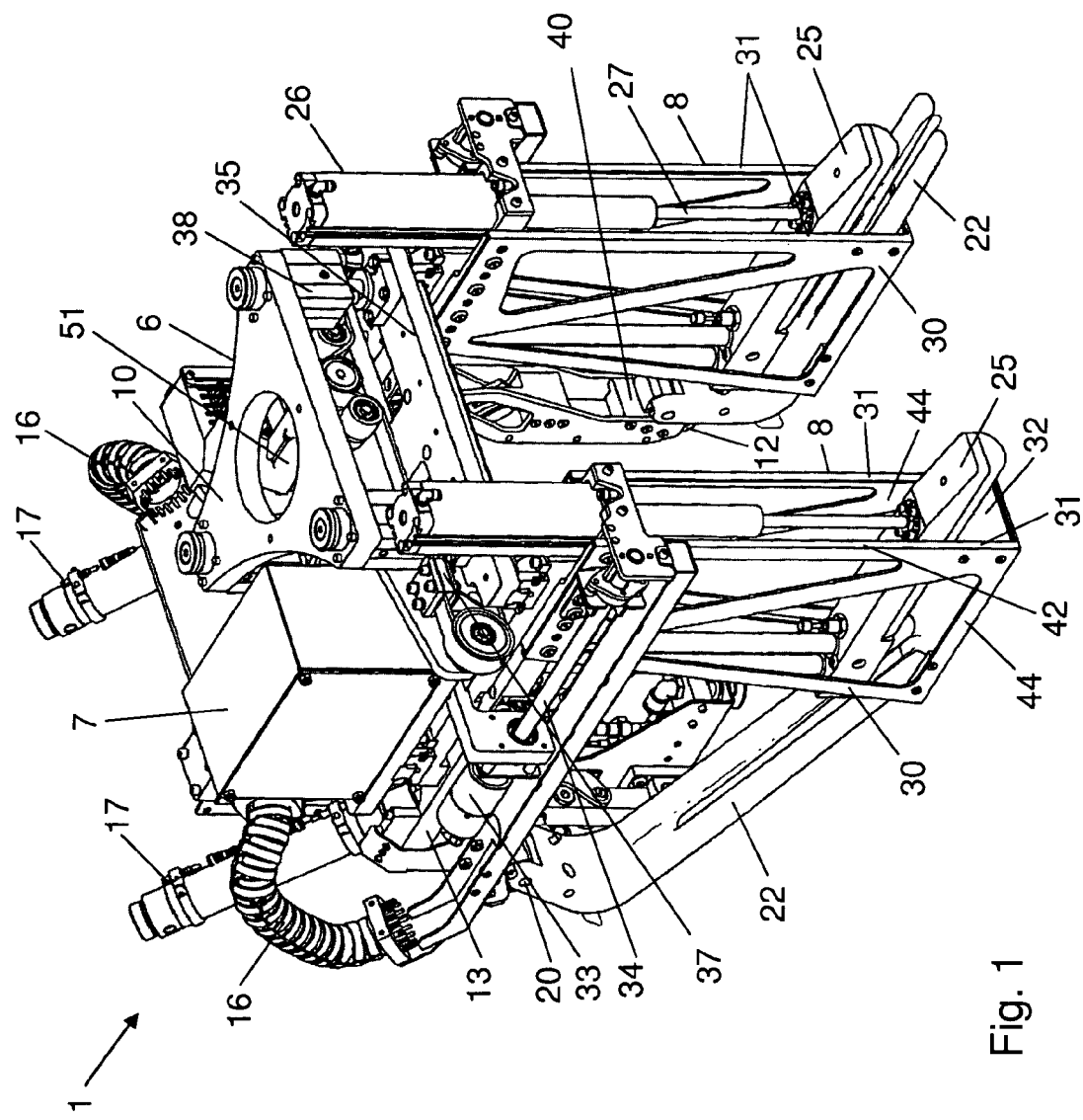
FIG. 1 is a three-dimensional view of a bundle gripper according to the invention.

According to FIG. 1, each stop element 30 has a lower wall 32 as well as two vertically extending side walls 44. According to FIG. 4, the stop elements 30 are respectively provided between these side walls 44 with a recess 39 that is open in the front and back. The side walls 44 each form a stop edge 31 in the front, which extends substantially vertical. Corresponding to the recess 39, the edges 31 are arranged at a distance and essentially parallel to each other. The two stop elements 30 are positioned on the rails 13 so that the two stop edges 31 are substantially vertical in all positions.

A separate arm 12 may be positioned pivoting on each of the two positioning rails 13. The arms 12 may be pivoted around a joint 21 at one upper end with the aid of an adjustment cylinder 17 that is positioned on the rail 13, or with the aid of any other suitable drive. The joints 21 are preferably rotating joints arranged on the positioning rail 13, in the movement region for the stop elements 30. The adjustment cylinders 17 respectively comprise a piston rod 18, which is connected to the arm 12 to rotate at a front end via a joint 19. At a distance to these rotating joints 19, a gripper finger 22 is respectively positioned via an articulated connection 40 and a joint 20 on the arm 12, wherein this gripper finger has an exposed front end 23 at a distance to this connection 40. The gripper fingers 22 and the front ends 23 together form a support surface 24 on which the bundle 2 and/or 2' is positioned as shown with FIGS. 2 and 3.

The individual two gripper fingers 22 may be moved between a horizontal orientation and a slanted, shovel-type orientation by activating the adjustment cylinder 17. With the position shown in front in FIG. 1, the gripper finger 22 is raised in the back as may be seen. In this position, the gripper finger 22 is pulled back to a position where the exposed end 23 is located behind the stop face 42. In the position shown in FIGS. 2 and 3, the two gripper fingers 22 respectively project partially and with different lengths over the stop faces 42.

Figure 2:
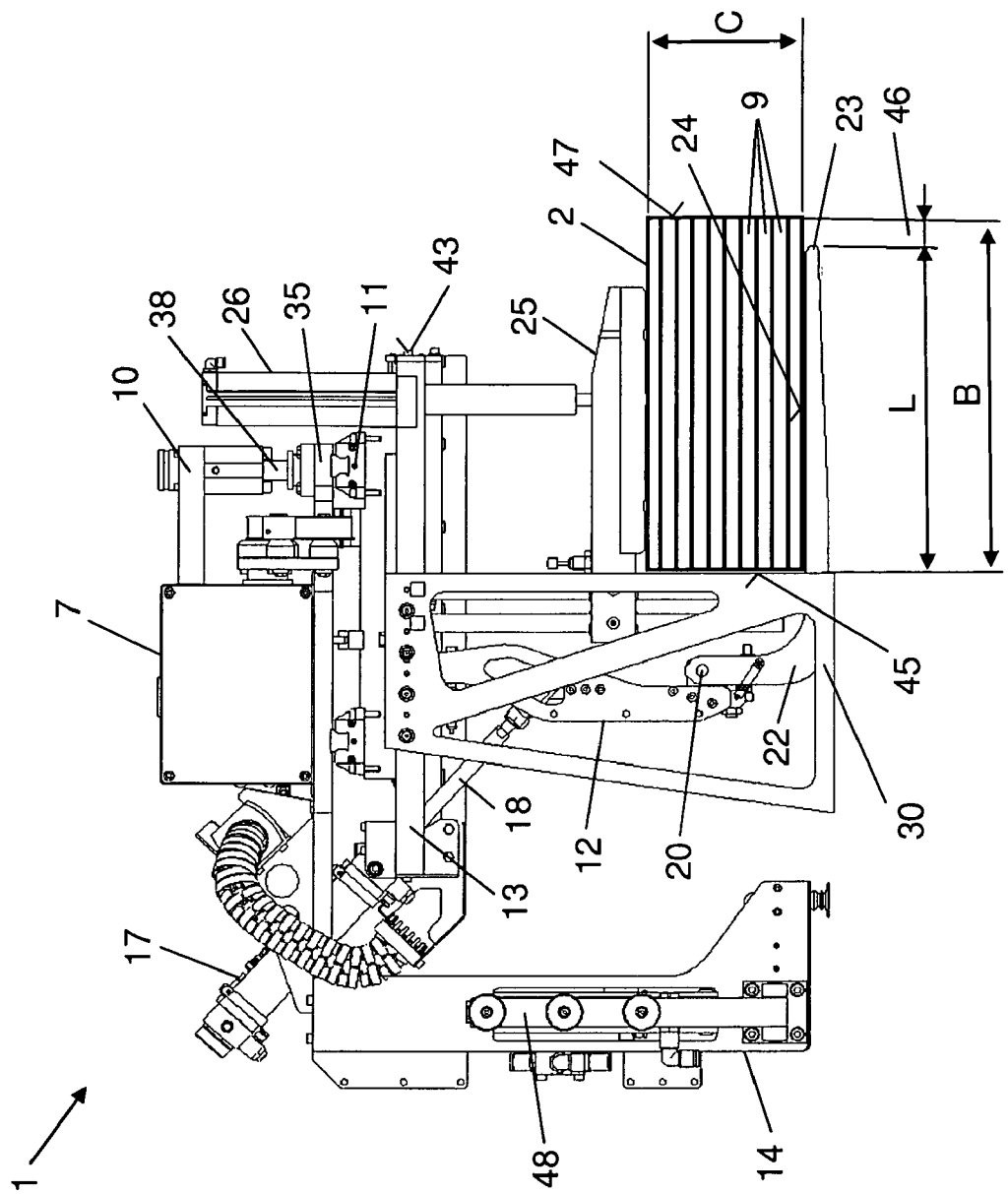
FIG. 2 is a view from the side of the bundle gripper, wherein a comparatively long bundle is gripped.
Figure 3:
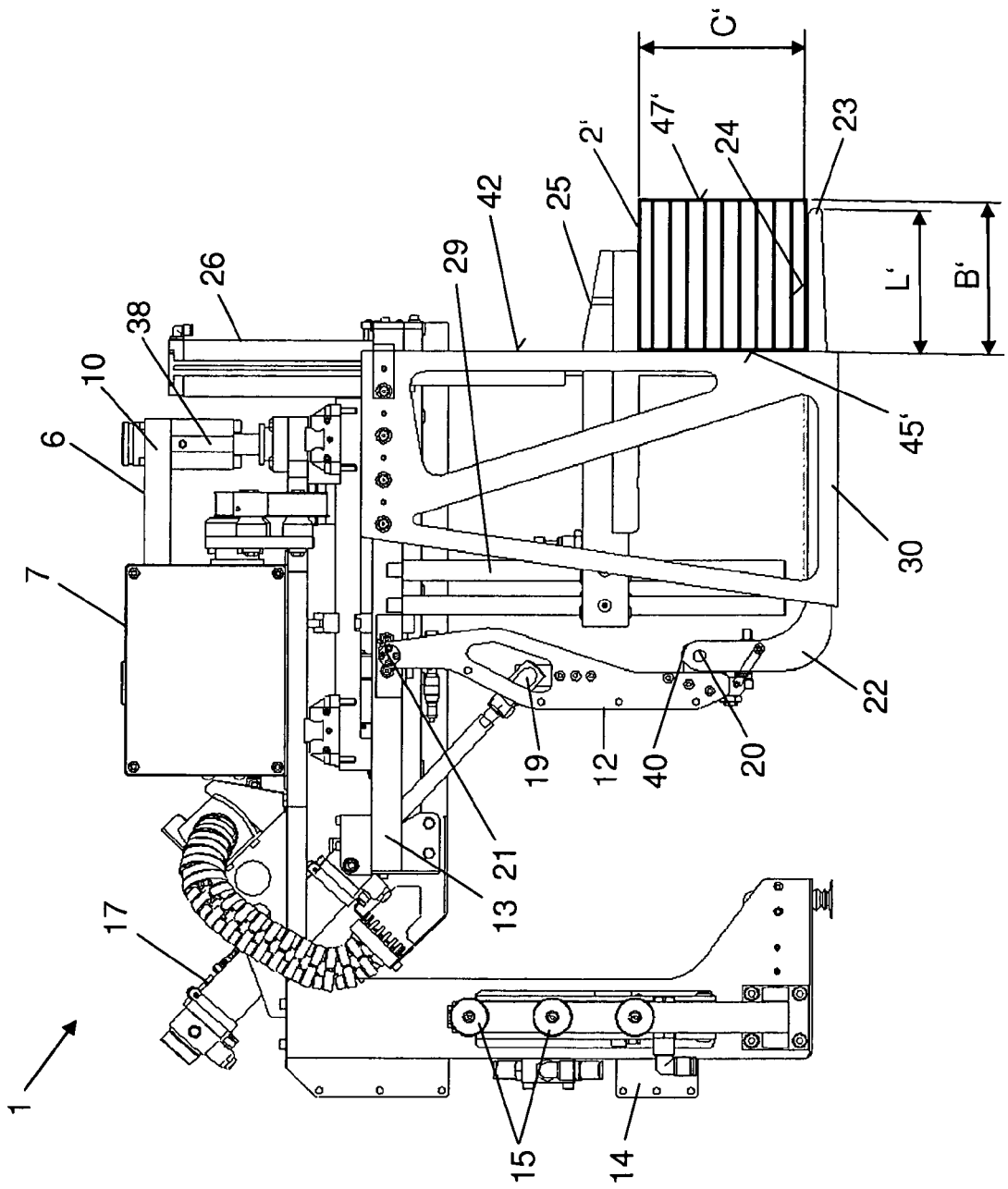
FIG. 3 is a view according to FIG. 2, but showing a comparatively short bundle.

In FIGS. 2 and 3, the gripper finger 22 is in the working second position. In FIGS. 2 and 3, the length L with which the gripper finger 22 projects over the stop face 42 is indicated with the double arrow L. The length L is determined by the position of the stop elements 30 and/or the stop faces 42, as well as the front end 23 of the gripper finger 22, relative to the front sides 43 of the positioning rail 13. For example, in the position according to FIG. 2, the length L is 500 mm, whereas it has a considerably shorter length L' of 140 mm in FIG. 3. Of course it is also possible to adjust any length in-between.

A hold-down clamp 25 that is guided vertically along guide rails 29 is furthermore arranged above each gripper finger 22 in the working position. The separate hold-down clamps 25 may be displaced vertically with an adjustment cylinder 26 or a different suitable drive. Each hold-down clamp 25 projects into a recess 39 and the hold-down clamp 25 may be slightly shorter than the gripper fingers 22. Together with a gripper finger 22, each hold-down clamp 25 functions to hold in place a bundle 2 and/or 2', so that the bundle 2 and/or 2' may be transported with corresponding movements of the bundle gripper 1 from the feeding device to the pallet 3. In the process, the bundle 2 and/or 2' rests with its back side 45 and/or 45' against a stop face 42. The exposed end 23 is preferably located behind a front 47 of the bundle 2 and/or 2', as shown in FIGS. 2 and 3, so that the bundles 2 and/or 2' respectively have an overhang 46, for example with a length of approximately 4-5 cm. However, the overhang 46 may also be less or more and may even be zero.

The frame 6 may further include an intermediate cardboard gripper 14 for removing respectively one intermediate cardboard 5 from the intermediate cardboard magazine, not shown herein. The cardboard gripper 14 may deposit the cardboard on the pallet 3. In order to grip the intermediate cardboard 5 or any other suitable intermediate layers, the gripper 14 includes a plurality of suction device 15, which are respectively arranged on an arm 48 that may be extended in the manner of a wing. The control unit 7 may also control the intermediate cardboard gripper 14. However, this intermediate cardboard gripper 14 is not required in principle and could be replaced with a different device arranged on the bundle gripper 1.

Figure 6:
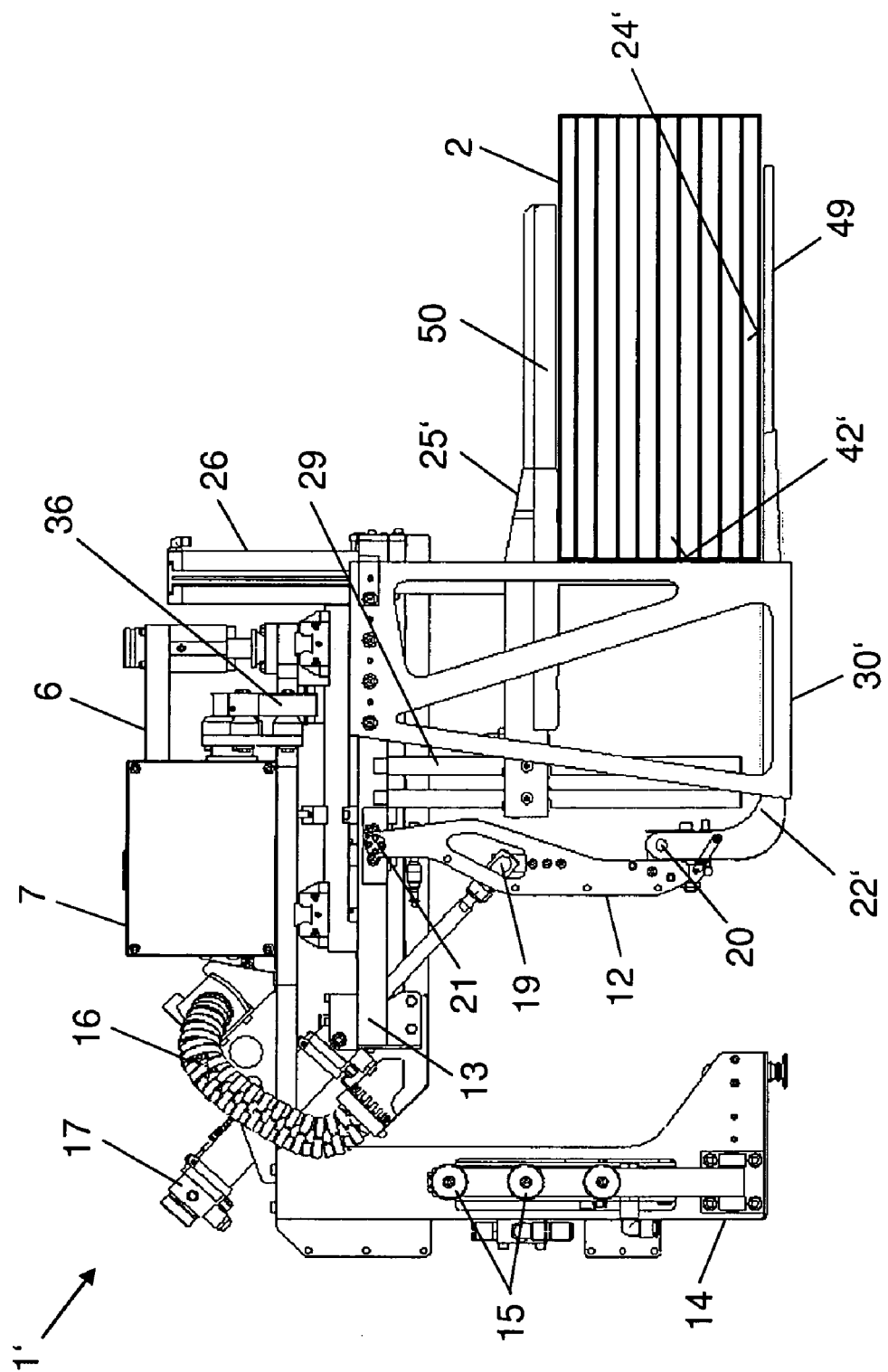
FIG. 6 is a view from the side of a bundle gripper according to one embodiment of the invention, wherein this gripper grips a comparatively long bundle.
Figure 7:
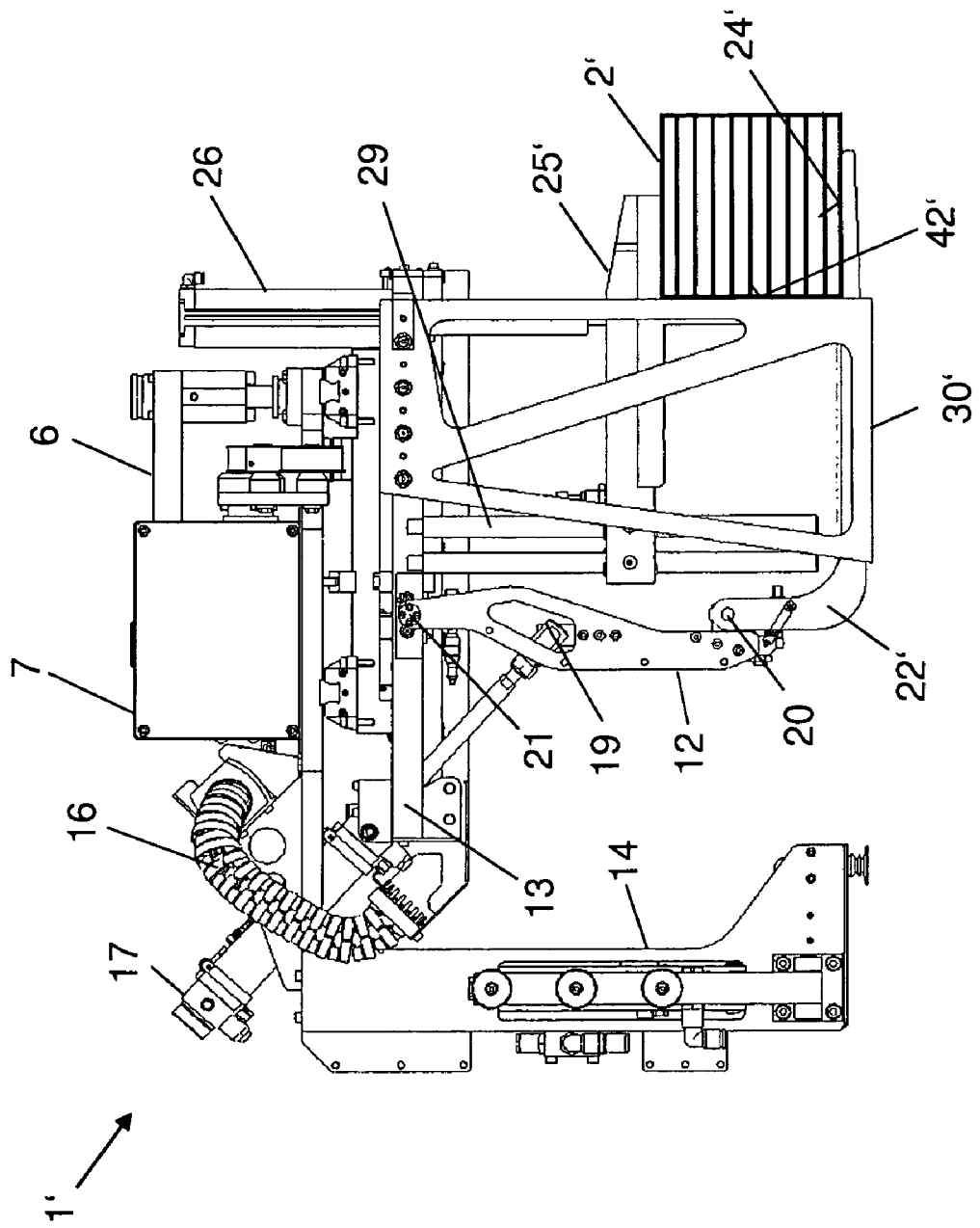
FIG. 7 is a view as shown in FIG. 6, but with a comparatively short bundle.

An alternative bundle gripper 1' shown in FIGS. 6 and 7, which essentially differs from the bundle gripper 1 in that the gripper finger 22' includes a telescopically extendable projection 49 on its front end. The hold-down clamp 25' is also provided with a similar, extendable projection 50. The two projections 49 and 50 may be moved with the aid of a suitable drive, e.g. with the aid of cylinders that are not shown herein. The projections 49 and 50 may be moved between the fully extended position shown in FIG. 6 and the retracted position shown in FIG. 7. The movement of the projections 49 and 50 may be controlled by the control unit 7. The gripper fingers 22' and the hold-down clamps 25' may be extended or shortened for adapting them to the length of a bundle 2 and/or 2'. The gripper fingers 22' and the hold-down clamps 25' thus project with various lengths over the stop surfaces 42' of the stop elements 30'. The stop elements 30' may thus remain in a fixed frontal position, as shown in FIGS. 6 and 7.

With the bundle gripper 1', the stop elements 30' may be attached fixedly to the frame 6 and/or to the support rails 13, wherein an embodiment is also conceivable where the stop elements 30' may be moved in the same way as for the bundle gripper 1. With the latter embodiment, an even larger range of different lengths of the bundles 2 and/or 2' may be covered. A combination embodiment of a bundle gripper 1 with a bundle gripper 1' may be provided for which the gripper finger 22' and the projection 49 and/or the hold-down clamp 25' and the projection 50 are adjusted manually. With the bundle gripper 1 as well as with the bundle gripper 1', a bundle 2 and/or 2' may be gripped and palletized with each unit 8. The bundles 2 and/or 2' are respectively held between a gripper finger 22 and/or 22' and a hold-down clamp 25 and/or 25'.

Figure 9:
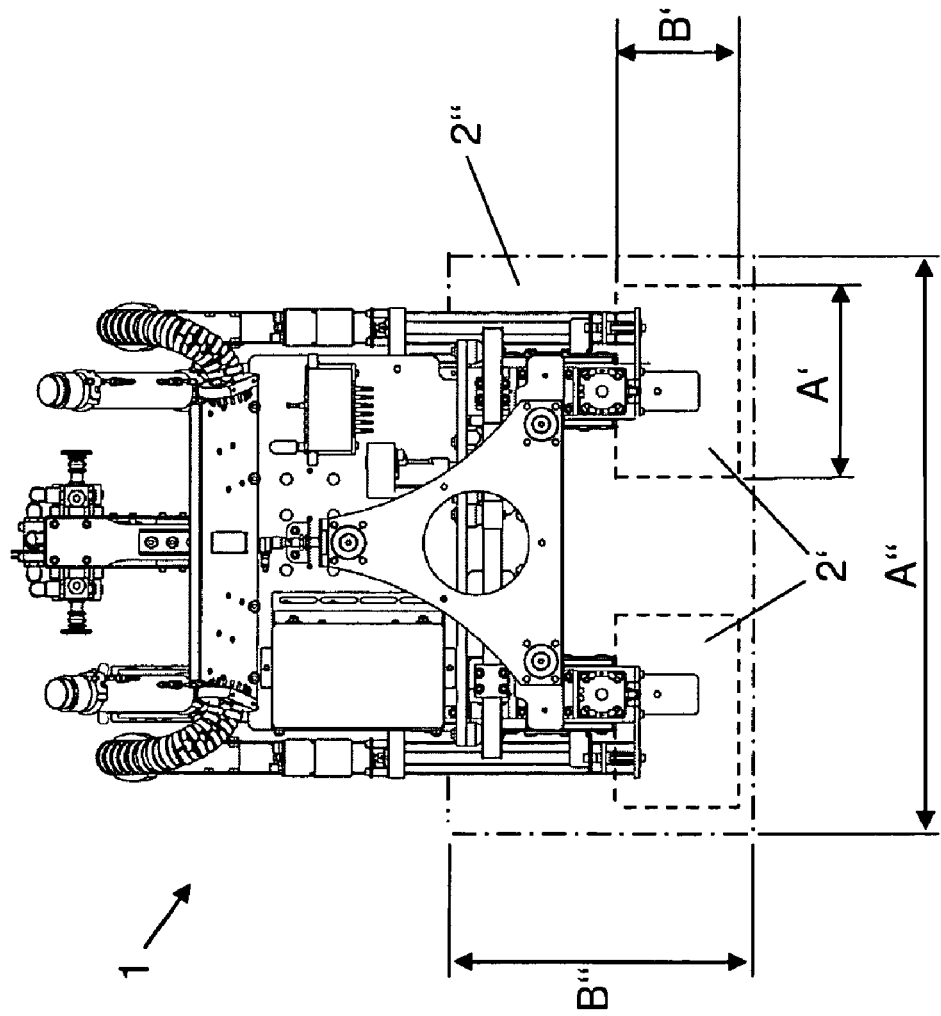
FIG. 9 is a view from above of the bundle gripper according to the invention, holding different size bundles.

The spacing between these bundles 2 and/or 2' may be adjusted, as explained in the above, by moving the units 8. However, bundles 2" having a very large bundle width A" may also be held with the aid of both units 8, as shown in FIG. 9. In that case, the bundle 2" is held by two gripper fingers 22 and/or 22' and two hold-down clamps 25 and/or 25'. The bundles 2 and/or 2' or 2", which may be palletized with the bundle gripper 1 and/or 1', may therefore have very different lengths and widths as well as heights. In the process, the position of the gripper units 8 does not necessarily have to be symmetrical to half the width B and/or B' or B" of the bundle 2 and/or 2' or 2".

The bundle grippers 1 and 1' are each provided with two gripping units 8. It may be conceivable to have only one or more than two units 8.

In the starting position, the bundle gripper 1 is positioned with the stop surfaces 42 in front of a feeding device that is not shown herein. The two gripper fingers 22 are in the retracted position, on the left according to FIG. 1, and the hold-down clamps 25 are in a raised position. The two bundles 2 and/or 2' are supplied to the stop surfaces 42 by the feeding device and are fitted against these surfaces. The two gripper fingers 22 are then moved to the operating position, shown on the right in FIG. 1, by correspondingly pivoting the arms 12. The gripper fingers 22 are moved in the manner of a shovel underneath each bundle 2 and/or 2'. The two stop elements 30 are positioned such that they have the desired overhang 46. By lowering the two hold-down clamps 25 and/or 25', the bundles 2 and/or 2' are clamped.

The hold-down clamps 25 and/or 25' may have an upper starting position, which may be adjusted to the bundle height C. The time required for lowering the hold-down clamps 25 and/or 25' onto the bundles 2, 2', 2" may be shortened in this way. The control unit 7 may select the upper starting position of the hold-down clamps 25 and/or 25', such that the hold-down clamps 25 and/or 25' are positioned approximately from 50 to 100 mm above the bundle before being lowered. Accordingly, the bundle height C must be transmitted to the control unit 7 by a processing device connected upstream of the palletizing machine and/or must be determined directly by the bundle gripper.

The bundle gripper 1 is then moved to the palletizing position, for example with the aid of a known robot arm. In the process, the spacing between the two units 8 may be adjusted during the movement of the gripper unit 1. For example, the two bundles 2 and/or 2' may be moved close to each other, so that the bundles may finally be deposited on the pallet 3 and/or an intermediate cardboard 5. The bundles may be deposited by pulling back the two gripper fingers 22 and slightly lifting up the two hold-down clamps 25. The bundles 2, 2', 2" may also be deposited on the pallet 3 so that the bundles 2, 2', 2" are pushed from the gripper fingers 22 onto the intermediate cardboard 5 by displacing the stop elements 30. For this, it may be necessary to compensate the movement of the stop element 30 with the aid of the palletizing machine that holds the bundle gripper 1. The bundles 2, 2', 2" to be deposited thus are immovable relative to the pallet 3. The bundle gripper 1 may then be moved back to the starting position, wherein the gripper fingers 22 and the hold-down clamps 25 are simultaneously also moved to the starting position. The gripper units 8 as well as the stop elements 30 may also be pre-adjusted to new bundle formats if necessary for the following gripper operation.

The stop elements 30 and/or the gripper units 8 may be correspondingly adjusted if the following bundles 2 and/or 2' are to be palletized with a different format. For longer bundle lengths B, the stop elements 30 may be moved toward the back. For shorter bundle lengths B, the stop elements 30 are moved forward, as shown in FIGS. 2 and 3. The gripper units 8 may be adjusted analog thereto. Therefore, for larger bundle widths A, the gripper units 8 are moved farther apart and for smaller bundle widths A, the gripper units 8 are moved closer together. An adjustment from two smaller bundles 2' arranged side-by-side to one larger bundle 2, 2" may be provided. The adjustments may be made automatically, as explained in the above, or they may be controlled with the aid of a drive. The changeover to a different format may thus be made very quickly during the running production and without manual intervention.

If comparatively small bundles 2' with a short bundle length B' are processed, the stop elements 30 may be moved toward the back. The two separate bundles 2' that are held one behind the other with a gripper unit 8 may be transported and deposited onto a pallet 3. Therefore, the front 47' of the rear bundle 2' contacts the back 45' of the second bundle 2' in front. The different arrangements of bundles 2, 2" deposited on pallets 3 require that at times only one of the gripper units 8 may be utilized.

The bundle gripper 1' may be operated in principle as described in the above for the palletizing. However, for a format change the stop elements 30 may not move, but the projections 49 and/or 50 may extend outward for different distances. A combination of the methods used with the bundle grippers 1 and 1' may also be provided, which allows covering an even larger format range.

It will be understood that the above description of the present invention is susceptible to various modifications, changes and adaptations, and the same are intended to be comprehended within the meaning and range of equivalents of the appended claims.

What is claimed is:

1. A bundle gripper for a palletizing machine for picking up respectively at least one bundle and depositing the bundle on a pallet, the bundle gripper comprising:
    a frame; and
    at least two gripper units, wherein each gripper unit comprises:
        an adjustable end stop coupled to the frame,
        at least one gripper finger coupled to the frame, wherein the gripper finger has a front end and is adjustable on the frame, the gripper finger being movable between a first position and a second position, wherein the gripper finger in the first position is located at least partially behind the end stop away from receipt of the bundle and in the second position is located in front of the end stop in a horizontal operating state to receive the at least one bundle, with the bundle fitting against the end stop, and
        a hold-down clamp coupled to the frame and positioned against the end stop for clamping the bundle against the gripper finger, and
    wherein a distance between the end stop and the front end of the gripper finger in the second position is changeable to adapt to different lengths of the bundles, the end stop and the gripper finger are each movable to change the distance, and the hold-down clamp is correspondingly adjustable to accommodate different lengths of the bundles.

2. The bundle gripper according to claim 1, wherein the end stop is movable in a horizontal direction in order to adapt to different bundle formats and different bundle lengths.

3. The bundle gripper according to claim 1, wherein the front end of the gripper finger is adjustable for adapting to different bundle formats and different bundle lengths.

4. The bundle gripper according to claim 3, wherein a length of the gripper finger is telescopically adjustable.

5. The bundle gripper according to claim 1, wherein a front end of the hold-down clamp is adjustable to adapt the bundle gripper to different bundle formats.

6. The bundle gripper according to claim 1, further comprising a motor coupled to the frame, wherein the motor adjusts the distance between the front end of the gripper finger and the end stop and/or adjusts a length of the hold-down clamp.

7. The bundle gripper according to claim 1, further comprising an articulated arm, wherein the gripper finger is coupled to the arm at a joint, wherein the arm moves the gripper finger between the first position and the second position.

8. The bundle gripper according to claim 7, wherein the arm and the gripper finger move together and wherein in the first position a back end of the gripper finger is elevated while the front end of the gripper finger remains in a horizontal plane of the second position so that the finger is positioned in the manner of a shovel.

9. The bundle gripper according to claim 1, wherein the at least two gripper units are adjustable on the frame so that a spacing between the at least two gripper units is adjustable.

10. The bundle gripper according to claim 1, further comprising a stop element, the stop element including a recess and the end stop, wherein the gripper finger is movable within the recess.

11. The bundle gripper according to claim 10, wherein the stop element further comprises two stop edges arranged at a distance to each other to form the recess, wherein the gripper finger is positioned between the two stop edges in the second position.

12. The bundle gripper according to claim 10, wherein the hold-down clamp is arranged above the gripper finger and is arranged within the recess of the stop element.

13. A method for palletizing bundles of products with the aid of a palletizing machine that comprises at least one bundle gripper having a frame and at least two gripper units, wherein each gripper unit includes an adjustable end stop coupled to the frame, at least one gripper finger coupled to the frame, and a hold-down clamp coupled to the frame and positioned against the end stop, wherein the bundle is fed from a feeding device to the bundle gripper, the method comprising:

stopping movement of the bundle from the feeding with the at least one end stop, wherein the bundle rests against the end stop;

gripping the bundle with the gripper finger and the hold-down clamp, wherein the gripper finger has a front end and is adjustable on the frame, wherein the gripping comprises moving the gripper finger from a first position to a second position, wherein the gripper finger in the first position is located at least partially behind the end stop away from receipt of the bundle and in the second position is located at least partially in front of the end stop in a horizontal operating state to receive the bundle;

adjusting a distance between the end stop and the front end of the gripper finger toward the second position to adapt to different lengths of the bundles by adjusting the end stop and/or the gripper finger; and adjusting the hold-down clamp correspondingly to accommodate different dimensions of bundles.

14. The method according to claim 13, wherein the adjusting step includes adjusting the distance between the end stop and the front end of the gripper finger with aid of a motor.

15. The method according to claim 13, wherein the bundle gripper further includes a stop element, the stop element including a recess and the end stop, and the method further comprises moving the stop element and/or adjusting the front end of the gripper finger to change the distance.

16. The method according to claim 15, further comprising depositing the bundle on a pallet, wherein the moving the stop element and/or the adjusting the front end of the gripper finger and/or adjusting the hold-down clamp occur after the depositing and/or prior to gripping a different bundle.

17. The method according to claim 13, further comprising altering the distance such that a predetermined overhang of the gripped bundle projects over the front end of the gripper finger.

18. The method according to claim 13, wherein the gripping further comprises:

positioning the gripper finger under the bundle; and clamping the bundle with the hold-down clamp.

19. The method according to claim 13, further comprising depositing the bundle on a pallet; and adapting an upper starting position of the hold-down clamp to a height of a following bundle after the depositing and/or prior to the gripping.

20. The method according to claim 19, wherein the gripping includes gripping the bundle only between the gripper finger and the hold-down clamp.

21. The method according to claim 13, wherein the gripping further comprises raising a back end of the gripper finger in the first position at an angle while keeping the front end in a lower horizontal plane in a manner of a shovel and maintaining an essentially horizontal orientation of the back end and front end in the lower horizontal plane in the second position.

* * * * *